(12) United States Patent
Tolstaya et al.

(10) Patent No.: US 9,075,548 B2
(45) Date of Patent: Jul. 7, 2015

(54) PRINTING CONTROL DEVICE, IMAGE FORMING APPARATUS, AND IMAGE FORMING METHOD

(71) Applicant: Samsung Electronics Co., Ltd., Suwon-si, Gyeonggi-do (KR)

(72) Inventors: Ekaterina Tolstaya, Moscow (RU); Ilia Safonov, Moscow (RU)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/248,599

(22) Filed: Apr. 9, 2014

(65) Prior Publication Data

US 2014/0218769 A1 Aug. 7, 2014

Related U.S. Application Data

(63) Continuation of application No. 13/226,764, filed on Sep. 7, 2011, now Pat. No. 8,730,526.

(30) Foreign Application Priority Data

Sep. 13, 2010 (RU) .................................. 2010137868
Feb. 21, 2011 (KR) ......................... 10-2011-0015092

(51) Int. Cl.
*H04N 1/405* (2006.01)
*G06F 3/12* (2006.01)
*G06T 11/00* (2006.01)
*H04N 1/409* (2006.01)

(52) U.S. Cl.
CPC ............ *G06F 3/1219* (2013.01); *G06F 3/1208* (2013.01); *G06F 3/1244* (2013.01); *G06T 11/00* (2013.01); *H04N 1/4092* (2013.01); *G06F 2206/1504* (2013.01)

(58) Field of Classification Search
CPC . H04N 2209/046; H04N 5/367; H04N 9/735; H04N 1/40; H04N 1/58; H04N 5/142; H04N 5/23212; H04N 5/23229; H04N 9/64; H04N 1/4092; G06T 2207/10024; G06T 5/20; G06T 5/003; G06T 2207/20192; G06T 7/0085; G06T 7/408
USPC ............... 358/1.9, 2.1, 3.01, 3.06, 3.21–3.24, 358/400, 500, 468, 3.15
See application file for complete search history.

(56) References Cited

U.S. PATENT DOCUMENTS 5,630,026 A  5/1997 Ogletree et al.
5,646,670 A  7/1997 Seto et al.

(Continued)

FOREIGN PATENT DOCUMENTS

EP   0920190     6/1999
JP   2005-017562 1/2005

OTHER PUBLICATIONS

European Search Report dated Feb. 14, 2013 issued in EP Application No. 1176885.9.

(Continued)

*Primary Examiner* — Thomas D Lee
*Assistant Examiner* — Stephen M Brinich
(74) *Attorney, Agent, or Firm* — Staas & Halsey LLP

(57) ABSTRACT

A printing control device is disclosed. The printing control device includes a user interface unit to receive an print command for a print job, an extraction unit to extract a bitmap image from the print job, a sketch image generating unit to generate a sketch image by using the extracted bitmap image, a print data generating unit to replace the bitmap image by the generated sketch image in the print job to generate print data, and a communication interface unit to transmit the generated print data to an image forming apparatus.

20 Claims, 11 Drawing Sheets

(56) References Cited

U.S. PATENT DOCUMENTS

| | | |
|---|---|---|
| 5,751,433 A | 5/1998 | Narendranath et al. |
| 5,751,434 A | 5/1998 | Narendranath et al. |
| 5,946,450 A | 8/1999 | Ebner et al. |
| 6,476,836 B2 | 11/2002 | Enami |
| 6,972,857 B2 | 12/2005 | Mantell et al. |

OTHER PUBLICATIONS

Kang H. et al.: "Coherent Line Drawing", International Symposium on Non-Photorealistic Animation Andrendering, xx, xx, No. 5th, Aug. 4, 2007, pp. 43-50, XP002469944.

Wen-Fu Lee et al.: "Efficient Construction of Saliency Map", Proceedings of Spie, vol. 7240, Feb. 5, 2009, pp. 724018-724018-8, XP055052682, ISSN: 0277-786X, DOI: 10.1117/12.811166.

Ilia V. Safonov et al.: "Bio-Inspiried Color Sketcch for Eco-Friendly Printing", Proceedings of Spie, vol. 8292, Jan. 22, 2012, p. 829218-1-829218-10, XP055052622, ISSN:0277-786X, DIO: 10.1117/12.906736.

Non-final Office Action issued Jul. 18, 2013 in co-pending U.S. Appl. No. 13/226,764.

Notice of Allowance Office Action issued Jan. 6, 2014 in co-pending U.S. Appl. No. 13/226,764.

U.S. Appl. No. 13/226,764, filed Sep. 7, 2011, Ilia Safonov, Samsung Electronics Co., Ltd.

Extended European Search Report issued in Application No. 14181443.4 dated Jan. 13, 2015 (9 pages).

PRINTING CONTROL DEVICE, IMAGE FORMING APPARATUS, AND IMAGE FORMING METHOD

CROSS-REFERENCE TO RELATED APPLICATIONS

This is a Continuation Application of prior application Ser. No. 13/226,764, filed on Sep. 7, 2011 in the United States Patent and trademark Office, which claims the benefit of priority from of Russian Patent Application No. 2010137868, filed Sep. 13, 2010, in the Russian Agency for Patents and Trademark, and Korean Patent Application No. 10-2011-0015092, filed Feb. 21, 2011, in the Korean Intellectual Property Office, the disclosure of which is incorporated herein by reference in its entirety.

BACKGROUND OF THE INVENTION

1. Field of the Invention

Apparatuses and methods consistent with the present general inventive concept relate to a printing control device, an image forming apparatus, and an image forming method. More particularly, the present general inventive concept relates to a printing control device, an image forming apparatus, and an image forming method, which can convert a bitmap image to a sketch image in print data and print the print data in which the bitmap image is converted to the sketch image.

2. Description of the Related Art

In modern printing devices, saving of a consumption agent, in particular, a toner, is very important and has significant ecological impact. In this regard, there are a lot of patents and publications devoted to draft printing or toner saving in printing devices via special processing to a rendered (rasterized) image of a printed page.

A general method for printing in a draft mode is decreasing an optical density for the whole image during rasterization. For electrophotographic and ink-jet printers, the decrease of the optical density is realized by means of an increase of brightness to pixels of rasterized graphical objects before rasterization thereof, which uses a halftoning or a change in halftoning threshold. For example, U.S. Pat. No. 5,646,670 proposes an apparatus and a method to reduce toner consumption by a decrease of overall image density for color image. U.S. Pat. No. 5,946,450 describes a method to reduce toner or ink consumption in rasterized image by a change of channel transfer function, which reduces the image in size as a whole. U.S. Pat. No. 6,476,836 describes an image forming apparatus where image pixels having values larger than a threshold are converted into a predetermined pattern received as a result of PWM (pulse width modulation), while for pixels of image having values not larger than the threshold, no output is made.

However, the decrease of optical density for the whole page seriously deteriorates the printed hardcopy in quality. If the optical density for the whole page is decreased, edges of characters in a text become ragged, the text becomes inaccurate in shape and poor in readability, and the text is sometimes not recognizable by OCR applications, as compared with a normal mode. In order to provide significant toner saving, the whole printed page has to be notably impaired, for example, 50% or more, in quality At present time, a majority of printed documents contains pictures, which are stored and transferred as color or grayscale bitmaps. For instance, web-pages, as a rule, contain a lot of bitmaps. Printing these bitmaps leads to a significant consumption of toner. To address this problem, there are several technical solutions, providing a capability to skip a printing of such bitmaps. For instance, US laid-open patent application No. 2009/0195811 describes a method for printing only text objects from PDF.

U.S. Pat. Nos. 5,751,433 and 5,751,434 describe systems and methods for draft printing by changing a function of channel transform in dependence from the type of printed object. It causes only the bitmaps to worsen in quality, and allows the text to preserve a quality thereof for draft printing.

U.S. Pat. No. 6,972,857 describes a method for controlling a use of consumable on a printing device. For every page, a page cost is set, and its value depends on the number of dots to be printed. If the page cost exceeds a preset threshold, at least one of known toner saving techniques is applied.

It is necessary to note that the existing approaches for draft printing either worsen the quality of the whole printed page or totally skip the printing of bitmaps, which leads to important information loss. On the other hand, sometimes, if the quality of draft printing is quite high, the amount of saved toner is insignificant.

Also, the majority of proposed methods for draft printing does not provide accurate estimation of saved toner.

SUMMARY OF THE INVENTION

Exemplary embodiments of the present general inventive concept overcome the above disadvantages and other disadvantages not described above. Also, the present general inventive concept is not required to overcome the disadvantages described above, and an exemplary embodiment of the present general inventive concept may not overcome any of the problems described above.

The present general inventive concept provides a printing control device, an image forming apparatus, and an image forming method, which can convert a bitmap image to a sketch image in print data and print the print data in which the bitmap image is converted to the sketch image.

Additional aspects and features of the present general inventive concept will be set forth in part in the description which follows and, in part, will be obvious from the description, or may be learned by practice of the general inventive concept.

Features of the present general inventive concept may be achieved by an image forming method that includes extracting a bitmap image from print data, converting the extracted bitmap image to a sketch image, replacing the bitmap image by the sketch image in the print data, and printing the print data in which the bitmap image is replaced by the sketch image.

The method may further include estimating a percentage of resource saved according to the replacement of the bitmap image by the sketch image, and informing a user of the percentage of saved resource.

The converting may include enhancing a contrast of the extracted bitmap image, converting the bitmap image with the enhanced contrast to a grayscale image, generating a mask by means of an edge detection of the grayscale image, and multiplying each of color channels of the bitmap image with the enhanced contrast by the mask to generate the sketch image.

The edge detection of the grayscale image may be performed by using a Difference-of-Gaussians filter with a limitation of subsequent threshold, and parameters and the threshold of the Difference-of-Gaussians filter may use a printing resolution and the size of image printed on a printing paper.

On the other hand, the converting may include enhancing a contrast of the extracted bitmap image, blurring the bitmap image with the enhanced contrast by using a Gaussian filter, generating a Saliency map for the bitmap image with the enhanced contrast, blending the bitmap image with the enhanced contrast and the blurred bitmap image by using the generated Saliency map as an alpha channel, converting the bitmap image resulting from blending to a grayscale image, generating a mask by means of an edge detection of the grayscale image, and multiplying each of color channels of the bitmap image with the enhanced contrast by the mask.

The edge detection of the grayscale image may be performed by using a Difference-of-Gaussians filter with a limitation of subsequent threshold, and parameters and the threshold of the Difference-of-Gaussians filter may use a printing resolution and the size of image printed on a printing paper.

The method may further include converting the sketch image to a grayscale image by using one of the following formulas:

$$I=0.3r+0.6g+0.2b,$$

$$I=(r+g+b)/3; \text{ and}$$

$$I=\max(r,g,b),$$

where r, g, and b are color channels of the sketch image, respectively.

The estimating the percentage of saved resource preferably includes calculating the percentage of saved printing resource by using the following formula:

$$E = \frac{\sum_n P(n)}{\sum_n P(n) + \sum_i (100/(100 - Eb(i))) \times Ns(i) - Ns(i)},$$

where E is the percentage of a saved printing resource, P(n) is the total number of dots used for printing all the replaced print data, i is the number of bitmap images included in the print data, Ns(i) is the total number of dots used for printing an i-th sketch image, and Eb(i) is a percentage of saved resource of the i-th sketch image according the replacement by the i-th sketch image and is calculated by the following formula:

$$Eb(i)=100\% \times (Nb(i)-Ns(i))/Nb(i),$$

where Nb(i) is the total number of dots used for printing an i-th bitmap image, and Ns(i) is the total number of dots used for printing the i-th sketch image.

The estimating the percentage of saved resource preferably includes calculating percentages of saved resources for respective printing colors, separately.

On the other hand, the converting may further include processing the generated mask with a dilation filter, and the multiplying may include multiplying each of the color channels of the bitmap image with the enhanced contrast by the mask processed with the dilation filter.

Features of the present general inventive concept may also be achieved by a printing control device connectable with an image forming apparatus includes a user interface unit to receive a print command for a print job, an extraction unit to extract a bitmap image from the print job, a sketch image generating unit to generate a sketch image by using the extracted bitmap image, a print data generating unit to replace the bitmap image by the generated sketch image in the print job to generate print data, and a communication interface unit to transmit the generated print data to the image forming apparatus.

The device preferably further includes an estimation unit to estimate a percentage of resource saved according to the replacement of the bitmap image by the sketch image, and the user interface unit preferably displays the estimated percentage of saved resource.

The sketch image generating unit may include a contrast enhancing part to enhance a contrast of the extracted bitmap image, a color converting part to convert the bitmap image with the enhanced contrast to a grayscale image, a mask generating part to generate a mask by detecting edges of the grayscale image, and a multiplication part to multiply the bitmap image with the enhanced contrast by the mask to generate the sketch image.

The sketch image generating unit preferably further includes a blurring part to blur the bitmap image with the enhanced contrast, a Saliency map generating part to generate a Saliency map for the bitmap image with the enhanced contrast, and a blending part to blend the bitmap image with the enhanced contrast and the blurred bitmap image by using the generated Saliency map as an alpha channel, and the color converting part preferably converts the bitmap image resulting from blending to a grayscale image.

The sketch image generating unit preferably further includes a filter part to process the generated mask with a dilation filter, and the multiplication part preferably multiplies the bitmap image with the enhanced contrast by the mask processed with the dilation filter.

The color converting part preferably converts the generated sketch image to a grayscale sketch image, and the print data generating unit preferably replaces the bitmap image by the grayscale sketch image in the print job to generate the print data.

Features of the present general inventive concept may also be achieved by an image forming apparatus includes a communication interface unit to receive print data, an extraction unit to extract a bitmap image from the received print data, a sketch image generating unit to generate a sketch image by using the extracted bitmap image, and an image forming unit to replace the bitmap image by the generated sketch image in the received print data and to print the print data with the replaced sketch image.

The sketch image generating unit may include a contrast enhancing part to enhance a contrast of the extracted bitmap image, a color converting part to convert the bitmap image with the enhanced contrast to a grayscale image, a mask generating part to generate a mask by detecting edges of the grayscale image, and a multiplication part to multiply the bitmap image with the enhanced contrast by the mask to generate the sketch image.

The sketch image generating unit preferably further includes a blurring part to blur the bitmap image with the enhanced contrast, a Saliency map generating part to generate a Saliency map for the bitmap image with the enhanced contrast, and a blending part to blend the bitmap image with the enhanced contrast and the blurred bitmap image by using the generated Saliency map as an alpha channel, and the color converting part preferably converts the bitmap image resulting from blending to a grayscale image.

The color converting part preferably converts the generated sketch image to a grayscale sketch image, and the image forming unit preferably replaces the bitmap image by the grayscale sketch image in the print data and prints the print data with the replaced sketch image.

BRIEF DESCRIPTION OF THE DRAWINGS

The above and/or other aspects of the present general inventive concept will become more apparent by describing certain exemplary embodiments of the present general inventive concept with reference to the accompanying drawings, in which.

DETAILED DESCRIPTION OF THE PREFERRED EMBODIMENTS

Figure 1A:
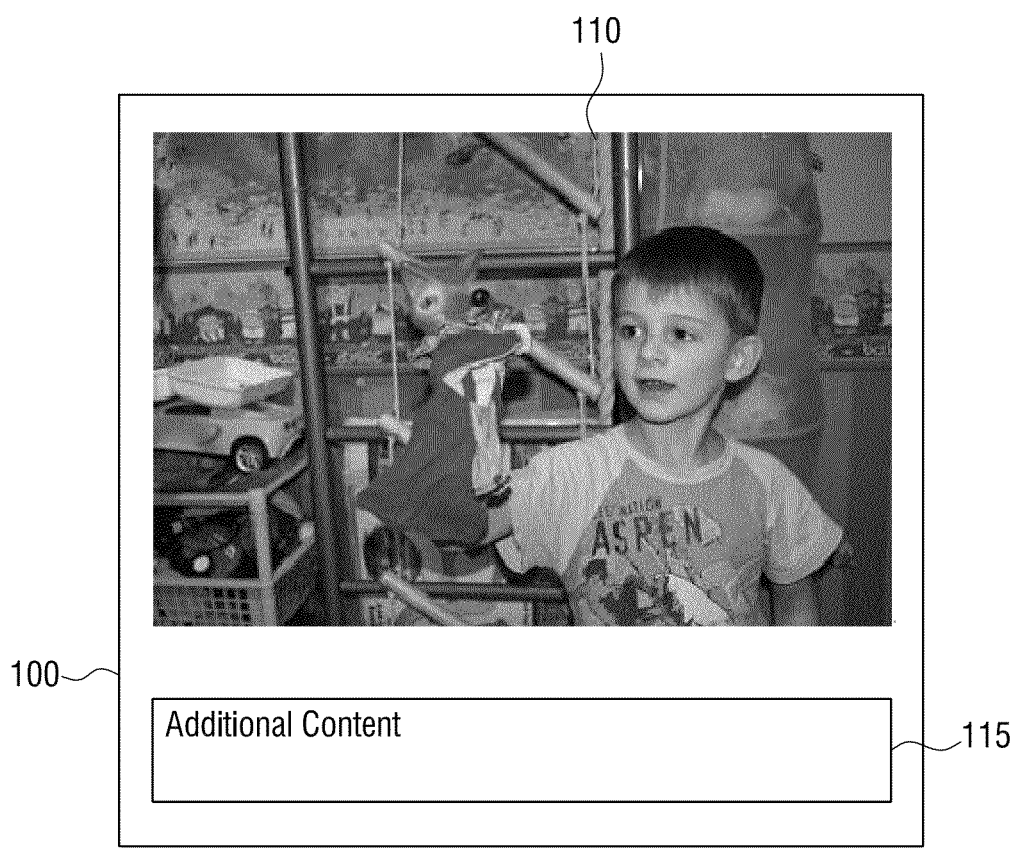
FIGS. 1A to 1C are views showing examples of a bitmap image, and an example of a sketch image converted from the bitmap image according to an exemplary embodiment of the present general inventive concept, respectively.

Exemplary embodiments of the present general inventive concept are described in greater detail below with reference to the accompanying drawings.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
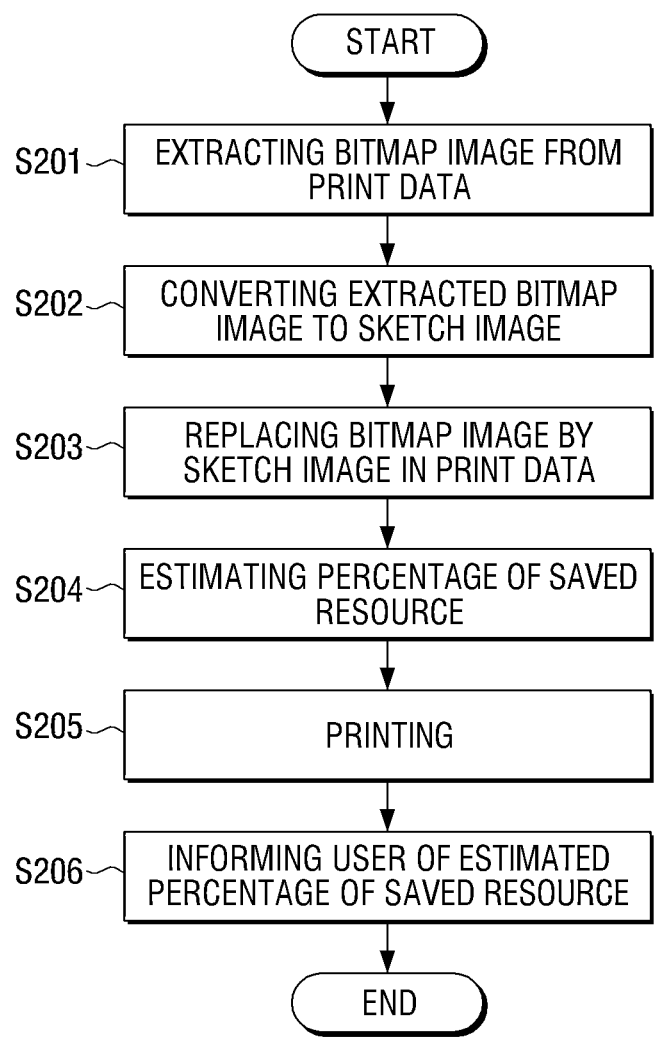
FIG. 2 is a flow chart illustrating an image forming method according to an exemplary embodiment of the present general inventive concept.

FIG. 2 is a flow chart showing an image forming method according to an exemplary embodiment of the present general inventive concept.

Referring to FIG. 2, a bitmap image is extracted from print data first (S201). To be specific, although the print data includes texts, bitmaps, and vector graphics, only the bitmap image may be extracted from the print data. Here, the print data may be print data, such as a page description language (PDL), for example, postscript (PS), PCL, XPS, PDF, etc., which are generated in a printing control device and transmitted to an image forming apparatus, or a file or the like, which is transmitted by a direct print method. On the other hand, the extracted bitmap image may be a grayscale bitmap image or a color bitmap image. It will be assumed and explained below that the extracted bitmap image is the color bitmap image.

The extracted bitmap image is converted to a sketch image (S202). Detailed descriptions on sketch image-converting operation will be explained with reference to FIGS. 3 and 4. If the print data includes a plurality of bitmap images, a plurality of sketch image corresponding to respective bitmap images may be produced.

Next, in the print data, the bitmap image is replaced by the sketch image (S203). The bitmap image in the print data is replaced by the sketch image generated through the process as described above to generate a new print data. If the plurality of bitmap images is included in the print data, they may be replaced by the corresponding bitmap images, respectively, to generate a new print data.

Thereafter, a percentage of resource saved according to the conversion of the bitmap image by the sketch mage is estimated (S204). In realization, this estimation operation may be omitted. Hereinafter, a method for estimating the percentage of saved resource will be described in detail.

Figure 7:
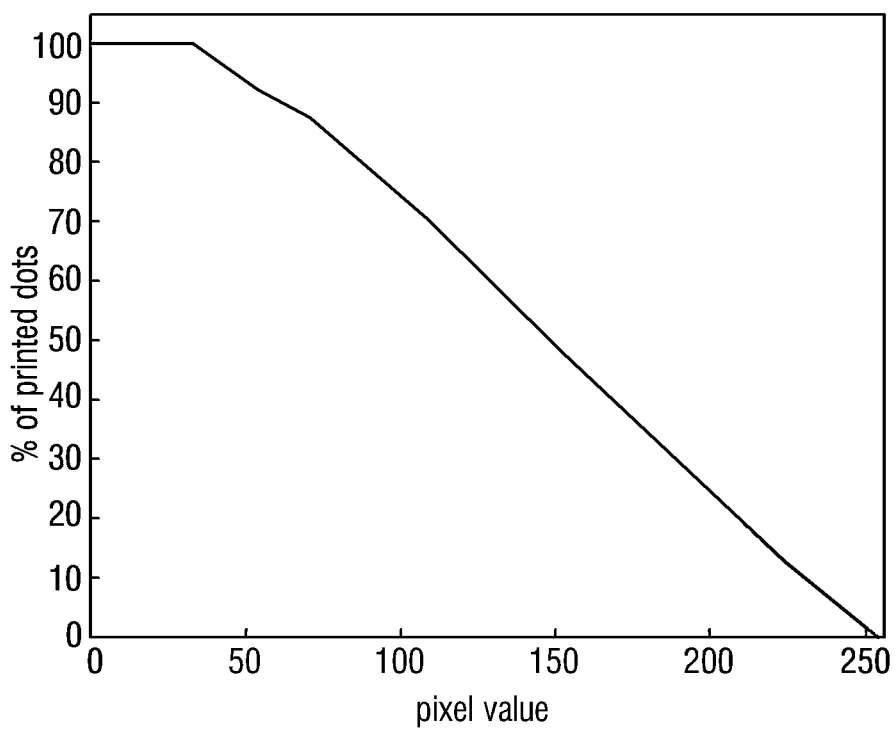
FIG. 7 is a view showing a relation between a pixel value and a percent of printed dots.

Every pixel of an image may correspond to several points on a printing paper. A function of dependence of a percentage of points to be printed to pixel values or color intensities of respective pixels may be received from preliminary calibration means of the image forming apparatus. For black-and-white printing devices, this function is formed from one argument-pixel value. FIG. 7 shows an example of such a function.

For color printing devices, arguments of vector with intensity values of color components of the function as described above are, for example, r, g, and b values. Therefore, the number of dots to be printed for a whole bitmap image may be estimated based on the function of dependence of the percentage of points to be printed to the pixel values or the intensities of color components. Accordingly, the percentage of saved printing resource for the bitmap image according to the conversion of the bitmap image by the sketch mage may be estimated by using the following mathematic formula 1:

$$Eb = 100\% \times (Nb - Ns)/Nb,$$ [mathematic formula 1]

where Eb is the percentage of a saved printing resource, Nb is the total number of dots used for printing the bitmap image, and Ns is the total number of dots used for printing the sketch image.

Here, Nb and Ns may be computed using the function of dependence of the percentage of points to be printed to the pixel values or the intensities of color components.

For color printing, the percentage of saved printing resource may be computed separately for each color to be printed. In addition, the number of printed dots for whole print data and the number of printed dots for the sketch image may counted in by means of an analysis of certain commands in PDL and corresponding display lists, which are an example of the print data.

The percentage of saved printing resource for the whole print data according to the conversion of the bitmap image by the sketch mage may be estimated by using the following mathematic formula 2:

[mathematic formula 2]
$$E = \frac{\sum_n P(n)}{\sum_n P(n) + \sum_i (100/(100 - Eb(i))) \times Ns(i) - Ns(i)},$$

where E is the percentage of saved printing resource for the whole print data, i is the number of bitmap images included in the print data, P(n) is the total number of dots used for outputting all the replaced print data, Ns(i) is the total number of dots used for outputting an i-th sketch image, and Eb(i) is a percentage of saved resource for the i-th sketch image according the conversion of an i-th bitmap image by the i-th sketch image.

Next, the print data in which the bitmap image is replaced by the sketch image is printed (S205). For instance, if the image forming method is carried out by a printing control device, the printing control device may transmit the print data with the replaced sketch image to the image forming apparatus to print them. If the image forming method is carried out by an image forming apparatus, the image forming apparatus may directly print the print data with the replaced sketch image.

Next, the computed percentage of saved resource may be displayed for a user (S206). For instance, if the image forming method is carried out by the printing control device, the percentage of saved resource may be displayed through a user interface window provided on the printing control device. If the image forming method is carried out by the image forming apparatus, information on the percentage of saved resource may be displayed through a user interface window provided on the image forming apparatus or may be transmitted to the printing control device, so that the percentage of saved resource is displayed through the user interface window provided on the printing control device for the user.

Hereinafter, an effect of the image forming method according to an exemplary embodiment of the present general inventive concept will be explained with reference to FIGS. 1A 1B, and 1C.

Figure 1B:
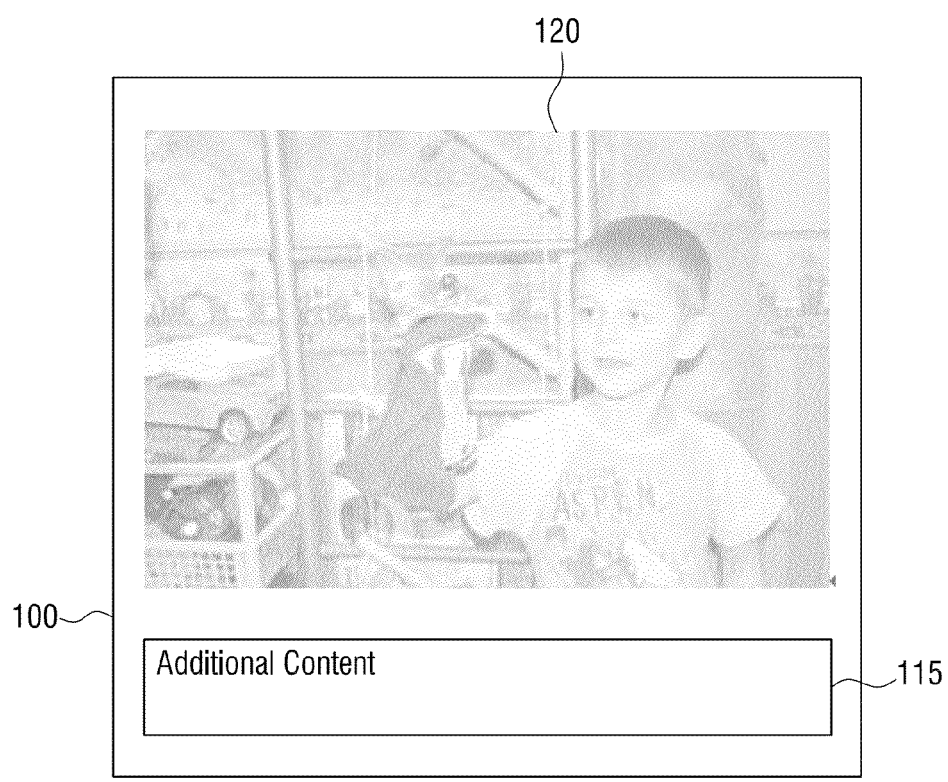
Figure 1C:
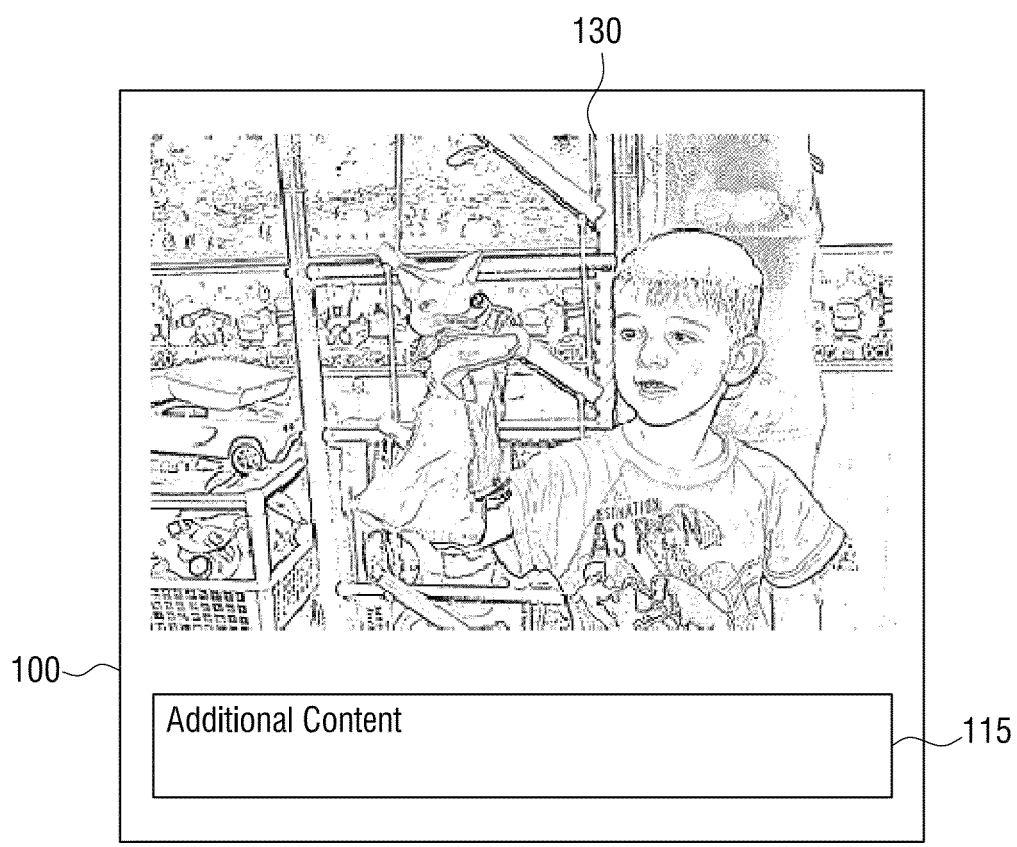

FIG. 1A shows an example of the bitmap image 110 included in print data 100, FIG. 1B shows an example of the bitmap image 120 included in the print data 100 when conventional toner saving techniques are used, and FIG. 1C shows an example of the sketch image 130 converted from the bitmap image 110 according to an exemplary embodiment of the present general inventive concept. The print data 100 may include additional content 115, such as text and graphics, that are not altered according to the present general inventive concept. Making a comparison between FIGS. 1C and 1B, it can be appreciated that toner saving rates in FIGS. 1C and 1B are approximately 83% to that in the FIG. 1A, but in FIG. 1B, the bitmap image 120 itself is so blurry that the user cannot easily distinguish contents therein, whereas in FIG. 1C, the sketch image 130 is so vivid that the user easily distinguish contents therein.

Thus, the image forming method according to an exemplary embodiment of the present general inventive concept converts the bitmap image included in the print data to the sketch image and outputs the print data in which the bitmap image is converted to the sketch image, thereby efficiently saving the resource, such as a toner or an ink, while maintaining discrimination for contents in the image.

Also, the image forming method according to an exemplary embodiment of the present general inventive concept can reliably estimate the percentage of resource saved according to the replacement of the bitmap image with the sketch mage and inform the user of it, thereby allowing the user to clearly understand the effect of the draft printing and thus to exactly make a plan for consumable replacement. The image forming method as shown in FIG. 2 may be executed on a printing control device 800 with construction of FIG. 8, an image forming apparatus 900 with construction of FIG. 9, or a printing control device or an image forming apparatus with any other construction.

Figure 3:
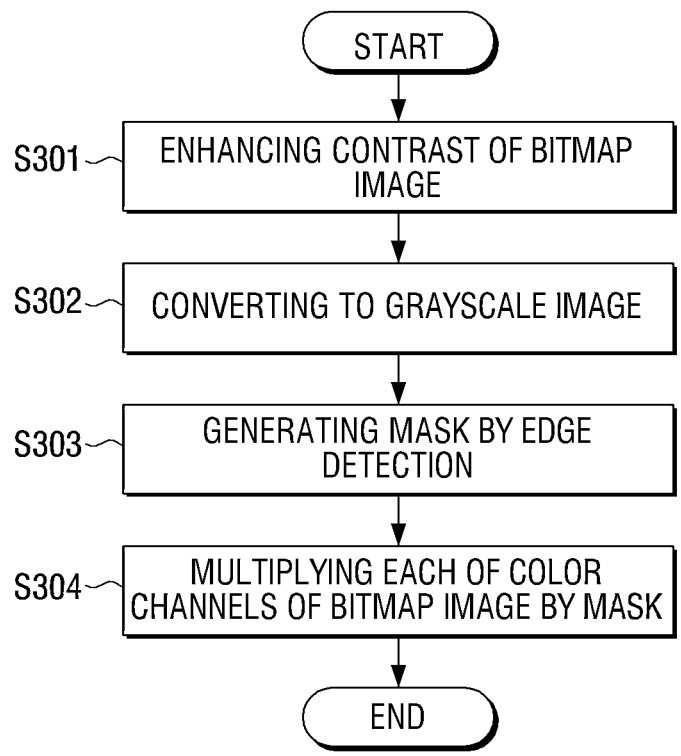
FIG. 3 is a flow chart concretely illustrating an example of a step of converting a bitmap image to a sketch image in FIG. 2.

FIG. 3 is a flow chart concretely illustrating an example of an operation to convert the bitmap image to the sketch image in FIG. 2. Here, it will be explained that the bitmap image is a color bitmap image and has r, g, and b channels.

First, to improve an appearance of the bitmap image and easily recognize it, a contrast of the bitmap image is enhanced (S301).

First of all, a global histogram H of the bitmap image is calculated. To calculate the histogram, a color bitmap may be converted to an intensity bitmap or a grayscale bitmap. There are various methods for converting the color image to the grayscale image. Among these methods, the following three methods are most widely used.

$$I=0.3r+0.6g+0.1b;\qquad\text{[mathematic formula 3]}$$

$$I=(r+g+b)/3;\text{ and}\qquad\text{[mathematic formula 4]}$$

$$I=\max(r,g,b),\qquad\text{[mathematic formula 5]}$$

where r, g, and b are r, g, and b channels in the bitmap image.

To convert the color image to the grayscale image, all of the mathematic formulas 3, 4, and 5 as described above may be used. However, it is desirable that the mathematic formula 5 is used.

A low boundary of range for contrast adjustment may be calculated by using the following mathematic formula 6:

$$\text{[mathematic formula 6]}$$

$$\text{low} = \min\left(T, \min\{i \mid H[i] \geq H_0\}, \min\left\{i \mid \sum_{k=0}^{i} H[k] \geq C_0\right\}\right),$$

where $H_0$ is a low threshold value for histogram level, $C_0$ is a low threshold value for histogram area and T is a threshold value for histogram intensity. The threshold value T for histogram intensity is applied to avoid excessive image darkening.

Figure 5:
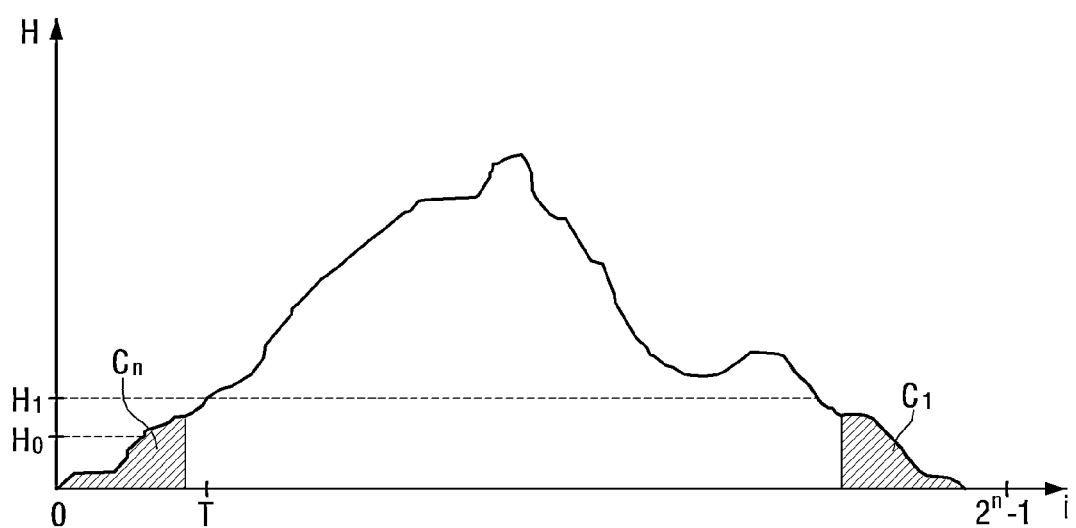
FIG. 5 is a view showing examples of various threshold values to an image histogram used in performing a step of enhancing a contrast of the bitmap image in FIGS. 3 and 4.

A high boundary of range for contrast adjustment may be calculated by using the following mathematic formula 7:

$$\text{[mathematic formula 7]}$$

$$\text{high} = \max\left(\max\{i \mid H[i] \geq H_1\}, \max\left\{i \mid \sum_{k=i}^{2^n-1} H[k] \geq C_1\right\}\right),$$

where $H_1$ is a high threshold value for histogram level and $C_1$ is a high threshold value for histogram area. FIG. 5 illustrates examples of the threshold values as described above.

When the low and high boundaries of range are calculated, a contrast enhancement for each of the r, g, and b color channels may be performed using the following mathematic formulas 8, 9, and 10:

$$r'=255\times(r-\text{low})/(\text{high}-\text{low});\qquad\text{[mathematic formula 8]}$$

$$g'=255\times(g-\text{low})/(\text{high}-\text{low});\text{ and}\qquad\text{[mathematic formula 9]}$$

$$b'=255\times(b-\text{low})/(\text{high}-\text{low}).\qquad\text{[mathematic formula 10]}$$

Here, r', g', and b' refer to the r, g, and b color channels having enhanced contrast. Next, the bitmap image with the enhanced contrast is converted to a grayscale image (S302). The bitmap image in which the contrast is enhanced using one of the mathematic formulas 3, 4, and 5 as described above may be converted to the grayscale image. In the present embodiment, although the bitmap image is explained as being converted to the grayscale image using only the mathematic formulas 3, 4, and 5, the present general inventive concept is not limited thereto. For instance, in realization, the bitmap image with the enhanced contrast may be embodied in such a manner that it is converted to the grayscale image by using any method other than the mathematic formulas 3, 4, and 5.

Thereafter, a mask is generated by means of an edge detection to the grayscale image (S303). The mask may be generated by using a Difference-of-Gaussians (DOG) filter with subsequent threshold to detect edges of the grayscale image, as in the following mathematic formula 11. In the present embodiment, although the mask is explained as being generated by using the DOG filter, the present general inventive concept is not limited thereto. For instance, in realization, the mask may be embodied in such a manner that it is generated by using any other edge detection method.

$$G_{\sigma_1}(x, y) = \frac{1}{\sqrt{2\pi\sigma_1^2}} e^{-\frac{x^2+y^2}{2\sigma_1^2}};$$ [mathematic formula 10]

$$G_{\sigma_2}(x, y) = \frac{1}{\sqrt{2\pi\sigma_2^2}} e^{-\frac{x^2+y^2}{2\sigma_2^2}};$$

and $$M = \begin{cases} 1, & (I*G_{\sigma_1} - I*G_{\sigma_2}) < T \\ 0, & \text{otherwise} \end{cases},$$

where I is the grayscale image, T is a threshold value, * is a convolution. DOG filter parameters σ1, σ2, and the threshold value T depend on a printing resolution and the size of image printed on a printing paper.

Next, a sketch image is created by multiplication of the bitmap image with the enhanced contrast by the generated mask (S304). The sketch image may be created by multiplying each of color channels of the bitmap image with the enhanced contrast by the generated mask, as in the following mathematic formulas 12, 13, and 14.

$$r = r' \times M$$ [mathematic formula 12]

$$g = g' \times M$$ [mathematic formula 13]

$$b = b' \times M$$ [mathematic formula 14]

Here, the values r, g, and b correspond to the r, g, and b channels having the enhanced contrast and sketch characteristics. The approach of creating the sketch image as described above is suitable for most bitmap images and produces a sketch image having good visual characteristics, thereby allowing the user to easily recognize the created sketch image.

However, for some images with contrast or textured background, sketch images created by the approach as described above may have too many contours, which may lead to a decline in resource saving and may complicate image recognizability. To overcome this drawback, an improved bitmap-to-sketch conversion approach is proposed. This approach is based on using of an Importance map or a Saliency map. Hereinafter, an operation of converting to the bitmap image to the sketch image by using the Importance map and the Saliency map is described with reference to FIG. 4.

Figure 4:
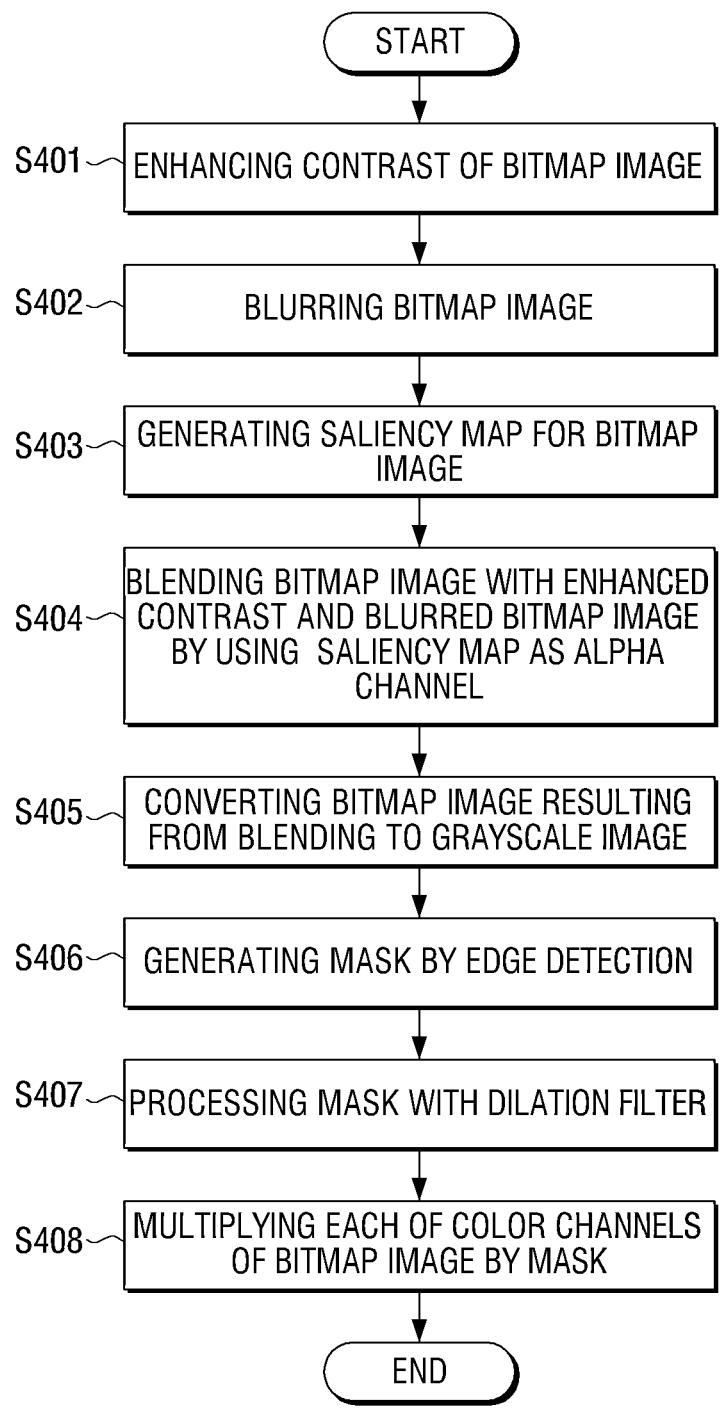
FIG. 4 is a flow chart concretely illustrating another example of the step of converting the bitmap image to the sketch image in FIG. 2.

FIG. 4 is a flow chart concretely illustrating another example of the operation to convert the bitmap image to the sketch image in FIG. 2.

First, a contrast of the bitmap image is enhanced (S401). Since this contrast enhancing operation is the same as that in the step S301 of FIG. 3, detailed description thereof will be omitted.

Next, the bitmap image with the enhanced contrast is blurred (S402). To be specific, as in the mathematic formulas 16, 17, and 18, each of r', g', and b' color channels of the bitmap image with the enhanced contrast is convoluted with a Gaussian filter value as shown in the following mathematic formula 15, so that a blurring for the bitmap image with the enhanced contrast is performed.

$$G_\sigma(x, y) = \frac{1}{\sqrt{2\pi\sigma^2}} e^{-\frac{x^2+y^2}{2\sigma^2}}$$ [mathematic formula 15]

$$r_b = r' * G_\sigma$$ [mathematic formula 16]

$$g_b = g' * G_\sigma$$ [mathematic formula 17]

$$b_b = b' * G_\sigma$$ [mathematic formula 18]

Figure 6:
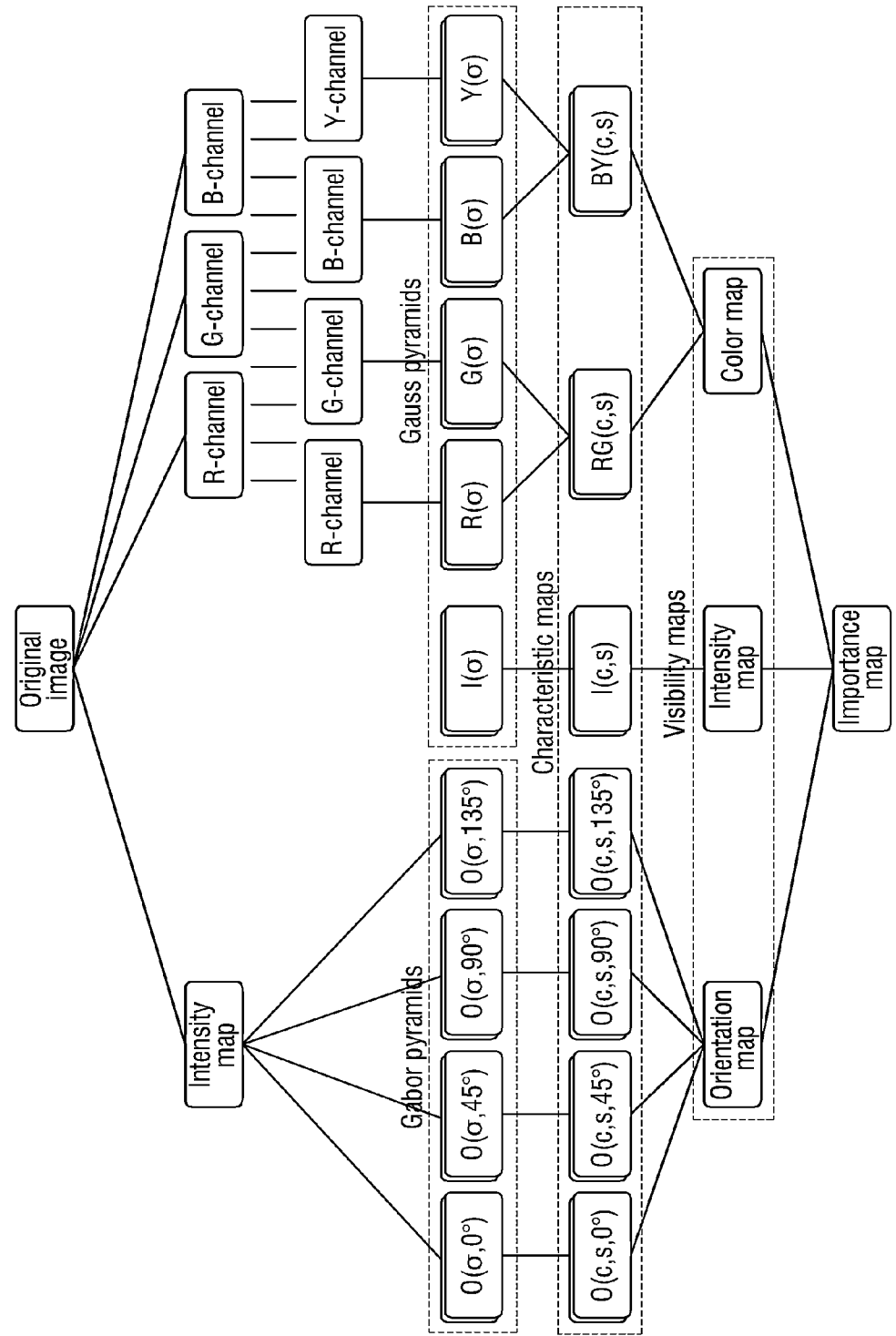
FIG. 6 is a view concretely illustrating a Saliency map generating operation in FIG. 4.

Here, $r_b$, $g_b$, and $b_b$ correspond to the r, g, and b channels having a blurred characteristic. Thereafter, a Saliency map for the bitmap image with the enhanced contrast is built (S403). The Saliency map may be built using an approach as shown in FIG. 6. Hereinafter, an operation of building the Saliency map will be explained with reference to FIG. 6.

First, an intensity map and four color channels R, G, B, and Y for the bitmap image with the enhanced contrast are built. The intensity map may be built by applying any one of the mathematic formulas 3, 4, and 5 as described above to the bitmap image with the enhanced contrast, and the four color channels may be computed through the following mathematic formulas 19, 20, 21, and 22:

$$R = r' - \frac{g' + b'}{2},$$ [mathematic formula 19]

$$G = g' - \frac{r' + b'}{2},$$ [mathematic formula 20]

$$B = b' - \frac{r' + g'}{2}, \text{ and}$$ [mathematic formula 21]

$$Y = \frac{r' + g'}{2} - \frac{|r' - g'|}{2} - b'.$$ [mathematic formula 22]

And then, 8-level Gaussian pyramids are constructed using the four color channels computed by the mathematic formulas 19, 20, 21, and 22 as described above and 8-level Gabor pyramids for orientations θ∈ {0,45,90,135} are created using the built intensity map.

By an operation of center difference of two maps, one of which is named a central (good) map, the scale of which is designated as c, and the other of which is named a surround (rough) map, the scale of which is designated as s, characteristic maps may be generated from the following mathematic formulas 23, 24, 25, and 26:

$$I(c,s)=|I(c)-I(s)|,$$ [mathematic formula 23]

$$RG(c,s)=|(R(c)-G(c))-(G(s)-R(s))|,$$ [mathematic formula 24]

$$BY(c,s)=|(B(c)-Y(c))-(Y(s)-B(s))|, \text{ and}$$ [mathematic formula 25]

$$O(c,s\theta)=|O(c,\theta)-O(s,\theta)|,$$ [mathematic formula 26]

where c ∈ {2,3,4} and s=c+δ, δ∈ {2,3}.

By the calculation as described above, the characteristic maps are generated as a result of difference of the central map and the surround map, the scales of which are reduced to the scale of the central map.

For each characteristic map, a visibility map may be created using central summation operation and normalization as in the following mathematic formulas 27, 28, and 29. The central summation consists in reducing of each map to a specified scale and a by-point summation.

[mathematic formula 27]
$$\bar{I} = \sum_{c=2}^{4} \sum_{s=c+3}^{c+4} N(I(c,s))$$

[mathematic formula 28]
$$\bar{C} = \sum_{c=2}^{4} \sum_{s=c+3}^{c+4} [N(RG(c,s)) + N(BY(c,s))]$$

[mathematic formula 29]
$$\bar{O} = \sum_{\theta \in \{0,45,90,135\}} N\left(\sum_{c=2}^{4} \sum_{s=c+3}^{c+4} N(O(c,s,\theta))\right)$$

Here, N( ) is a normalization operator.

The normalization operator consists of two parts. To be specific, at first, a Gaussian filter is applied in order to decrease noises and random peaks, and then an average local maximum (ALM) is computed. After computation of the average local maximum, the whole image is multiplied by the value. An application of such a normalization method allows very bright background to be neglected in the Saliency map, and leaves only the more important sites, which have not been masked by raised brightness.

Next, orientation maps $\bar{O}$ related to the orientation, color maps $\bar{C}$ related to the color, and intensity maps $\bar{I}$ related to the intensity are summed with weights into a final image which is called the saliency map S, as in the following mathematic formula 30:

[mathematic formula 30]
$$S = \frac{wI \cdot N(\bar{I}) + wC \cdot N(\bar{C}) + wO \cdot N(\bar{O})}{wI + wC + wO},$$

where wI is a weight for intensity map, wO is a weight for orientation map, and wC is a weight for intensity map.

Since information about the brightness and the orientation is more important than color information, the weights may be set and used in relations wI=wO=2 and wC=1. Further, S is normalized to range from 0 to 1.

In the exemplary embodiment, although the operation is explained as building the Saliency map in the approach as shown in FIG. 6, the present general inventive concept may build the Saliency map by any other approaches. For instance, an approach for Saliency map building described on the paper "Efficient Construction of Saliency Map" by Wen-Fu Lee, Tai-Hsiang Huang, Yi-Hsin Huang, Mei-Lan Chu, and Homer H. Chen (SPIE-IS&T/Vol. 7240, 2009) may be used.

Referring again to FIG. 4, when the Saliency map is built, the bitmap image with the enhanced contrast and the blurred bitmap image are blended using the built Saliency map as an alpha channel (S404). The blending of the bitmap image with the enhanced contrast and the blurred bitmap image are performed using the following mathematic formulas 31, 32, and 33:

$r_1 = S \times r' + (1-S) \times r_b,$ [mathematic formula 31]

$g_1 = S \times g' + (1-S) \times g_b,$ and [mathematic formula 32]

$b_1 = S \times b' + (1-S) \times b_b.$ [mathematic formula 33]

Such a process allows a background in the bitmap image to blur and prevents the sketch image from occurring unnecessary lines thereon.

And then, the blended image is converted to a grayscale image (S405). The conversion of the blended image to the grayscale image may be performed using the any one of the mathematic formulas 3, 4, and 5 as described above.

Thereafter, a mask is generated by means of an edge detection on the grayscale image (S406). Since this operation of generating the mask is the same as the step (S303) as described above, a detailed description thereof will be omitted.

Next, the generated mask is processed with a morphological dilation filter (S407). Here, structural elements of the dilation filter may be varied according to an image forming apparatus and a resolution thereof. Also, this step is optional.

Finally, the bitmap image is multiplied by the generated mask to create a sketch image (S408). The sketch image may be created by multiplying each of color channels of the bitmap image with the enhanced contrast by the generated mask, as in the following mathematic formulas 34, 35, and 36:

$r = r_1' \times M;$ [mathematic formula 34]

$g = g_1' \times M;$ and [mathematic formula 35]

$b = b_1' \times M,$ [mathematic formula 36]

where r1', g1', and b1' are r, g, and b color channels of the bitmap image with the enhanced contrast, respectively, M is the mask, and r, g and b are r, g, and b color channels of the sketch image, respectively.

If the sketch image is created by the approach as described above, it can be created in such a form that even for the image with contrast or textured background, the counter thereof is properly adjusted.

On the other hand, the created color sketch image may be converted to a grayscale sketch image by using one of the following mathematic formulas 37, 38, and 39, so that it is used.

$I = 0.3r + 0.6g + 0.1b$ [mathematic formula 37]

$I = (r+g+b)/3$ [mathematic formula 38]

$I = \max(r,g,b)$ [mathematic formula 39]

If the color sketch image is converted to the grayscale sketch image, the percentage of saved resource can be improved.

Figure 8:
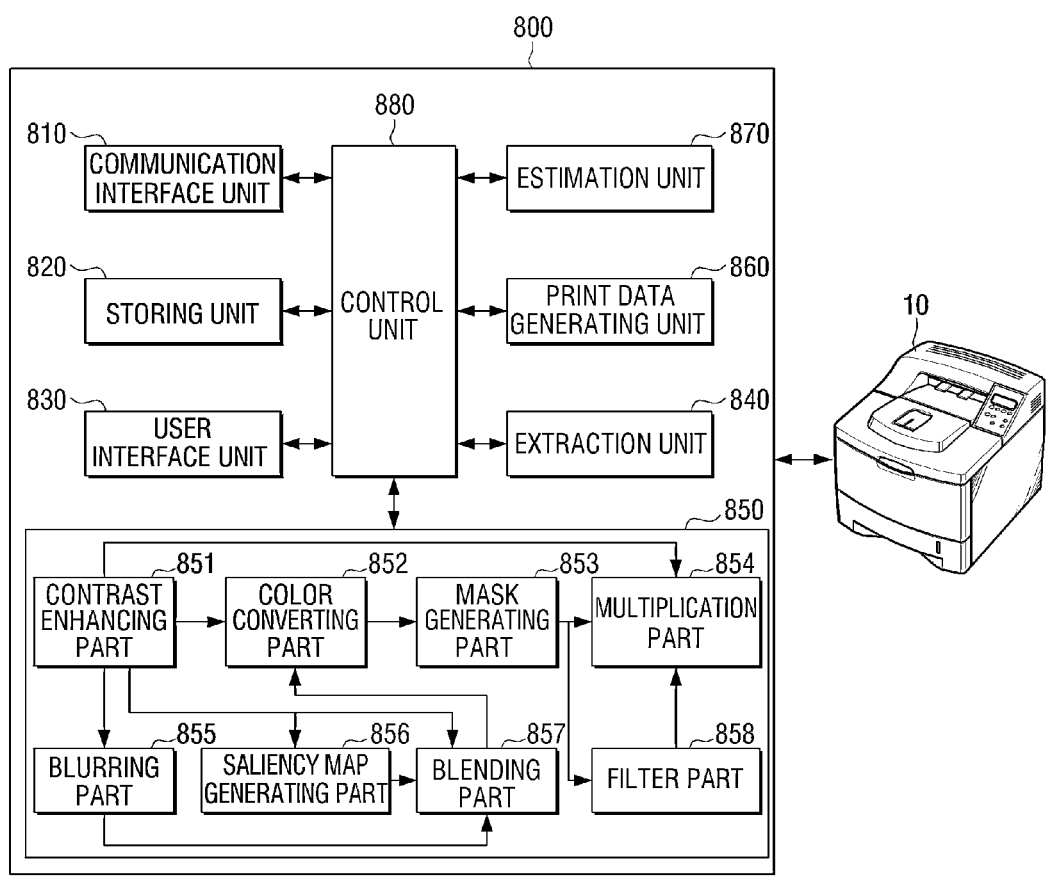
FIG. 8 is a block diagram showing a construction of a printing control device according to an exemplary embodiment of the present general inventive concept.

FIG. 8 is a block diagram showing a construction of a printing control device according to an exemplary embodiment of the present general inventive concept.

Referring to FIG. 8, the printing control device 800 may include a communication interface unit 810, a storing unit 820, a user interface unit 830, an extraction unit 840, a sketch image generating unit 850, a print data generating unit 860, an estimation unit 870, and control unit 880.

The user interface unit 830 has a plurality of function keys with which the user can set or select a variety of functions provided by the printing control device 800, and receives a print command for a print job from the user. Further, the user interface unit 830 may be embodied by a device, such as a touchpad or the like, capable of simultaneously implementing inputs and outputs, and embodied combining an input device, such as a mouse, a keyboard and the like, and a display device, such a CRT monitor, a LCD monitor, LED or the like.

The storing unit 820 may store print jobs. Here, the print job may be a file, for example, a document file or a web page, including contents, such as a text, a bitmap image and a vector graphic. Further, the storing unit 820 may store print data generated at a print driver provided on the printing control device 800 or a print date generated at the print data generating unit 860 to be described later.

On the other hand, the storing unit 820 may be embodied by a storing medium in the printing control device 800 and an outer storing medium, for example, a removable disk including a universal serial bus (USB) memory, a storing medium connected to a host, a web server connected through a network, etc.

The communication interface unit 810 is provided for connecting the printing control device 800 with the image forming apparatus 10, and may be formed in a form connected by wire or wireless through a local area network (LAN) and an internet network, or a form connected through a USB port. Further, the communication interface unit 810 may transmit the print data generated at the print data generating unit 860 to the image forming apparatus 10.

The extraction unit 840 extracts a bitmap image from the print job. The extraction unit 840 may extract the bitmap image among a variety of contents included in the print job. Further, if a plurality of bitmap images is included in the print job, the extraction unit 840 may extract the plurality of bitmap images included in the print job. The extraction unit 840 may comprise a processor, memory, and control logic, and may include programs and drivers stored in memory and executed by a processor. The processor may be part of the control unit 880, and the extraction unit 840 may include programs stored in the storing unit 820, or the extraction unit 840 may comprise separate components from the control unit 880 and storing unit 820.

The sketch image generating unit 850 generates a sketch image using the extracted bitmap image. The sketch image generating unit 850 may include a contrast enhancing part 851, a color converting part 852, a mask generating part 853, a multiplication part 854, a blurring part 855, a Saliency map generating part 856, a blending part 857, and a filter part 858. The sketch image generating unit 850 may comprise a processor, memory, and control logic, and may include programs and drivers stored in memory and executed by a processor. The processor may be part of the control unit 880, and the sketch image generating unit 850 may include programs stored in the storing unit 820, or the sketch image generating unit 850 may comprise separate components from the control unit 880 and storing unit 820.

The contrast enhancing part 851 enhances a contrast of the extracted bitmap image. Since the approach of enhancing the contrast is previously explained with referenced to the step S301 of FIG. 3, a detailed description thereof will be omitted.

The color converting part 852 converts the bitmap image with the enhanced contrast to a grayscale image. The color converting part 852 may convert the bitmap image with the enhanced contrast to the grayscale image by using one of the mathematic formulas 3, 4, and 5 as described above.

Further, if the blending part 857 to be described later generates a blended bitmap image, the color converting part 852 may convert the blended bitmap image to a grayscale image.

Also, the color converting part 852 may convert a sketch image generated at the multiplication part 858 to be described later to a grayscale sketch image. The color converting part 852 may convert the sketch image generated at the multiplication part 858 to the grayscale sketch image by using one of the mathematic formulas 37, 38, and 39 as described above.

The mask generating part 853 generates a mask by detecting edges of the grayscale image. The mask generating part 853 may generate the mask by detecting edges of the grayscale image generated at the color converting part 852 by using a Difference-of-Gaussians (DOG) filter with a limitation of subsequent threshold, as in the mathematic formula 11 as described above.

The multiplication part 854 multiplies the bitmap image with the enhanced contrast by the mask to generate the sketch image. The multiplication part 854 may generate the sketch image by multiplying each of color channels of the bitmap image with the enhanced contrast by the mask generated at the mask generating part 853, as in the mathematic formulas 12, 13, and 14 as described above.

Further, the multiplication part 854 may generate a sketch image by multiplying each of the color channels of the bitmap image with the enhanced contrast by a mask processed with a dilation filter at the filter part 858.

The blurring part 855 blurs the bitmap image with the enhanced contrast. The blurring part 855 may perform a blurring of the bitmap image with the enhanced contrast by convoluting each of r', g', and b' color channels of the bitmap image with the enhanced contrast with the Gaussian filter value as shown in the mathematic formula 15, as in the mathematic formulas 16, 17, and 18 as described above.

The Saliency map generating part 856 generates a Saliency map for the bitmap image with the enhanced contrast. Since the concrete operation of generating the Saliency map was previously explained in detail with referenced to FIG. 6, a detailed description thereof will be omitted here.

The blending part 857 blends the bitmap image with the enhanced contrast and the blurred bitmap image by using the generated Saliency map as an alpha channel. The blending part 857 may blend the bitmap image with the enhanced contrast and the blurred bitmap image by using the mathematic formulas 31, 32, and 33 as described above.

The filter part 858 processes the generated mask with the dilation filter.

The print data generating unit 860 replaces the bitmap image by the generated sketch image in the print job to generate print data. The print data generating unit 860 may replace the bitmap image in the print job by the sketch image generated at the sketch image generating unit 850, and generate the print data in which the bitmap image is replaced by the sketch image. The generated print data may have a form of one of postscript (PS), PCL, XPS, and PDF. If a plurality of bitmap images is included in the print job, the print data generating unit 860 may replace the plurality of bitmap images included in the print job by the corresponding sketch images, respectively, and generate the print data. This print data generating unit 860 may be a printer driver. In an exemplary embodiment, although the extraction unit 840, the sketch image generating unit 850, the print date generating unit 860 and the estimation unit 870 are explained as being separately formed, they may be embodied by a single component, for example, a printer driver, executed by a processor and control logic circuitry, in which all constructions thereof are included.

The estimation unit 870 estimates a percentage of resource saved according to the replacement of the bitmap image by the sketch image. Since the approach of estimating the percentage of saved resource is previously explained with referenced to FIG. 2, a detailed description thereof will be omitted.

The control unit 880 may control a variety of components included in the printing control device 800. When the control unit 880 receives the print command for the print job from the user, it controls the extraction unit 840 and the sketch image generating unit 850 to extract the bitmap image from the selected print job and to convert the extracted bitmap image to the sketch image, respectively. And then, when the sketch image is generated, the control unit 880 controls the print data generating unit 860 to replace the bitmap image by the sketch image in the print data thus to generate the print data in which the bitmap image is replaced by the sketch image, and controls the communication interface unit 810 to transmit and print the generated print data to and in the image forming apparatus 10.

Further, the control unit 880 may control the estimation unit 870 to estimate the percentage of saved resource according to the replacement of the bitmap image by the sketch image and control the user interface unit 830 to display the estimated of saved resource and thus to inform the user of it.

As described above, the printing control device 800 according to an exemplary embodiment of the present general inventive concept converts the bitmap image included in the print job to the sketch image and outputs the print data in which the bitmap image is converted to the sketch image, thereby efficiently saving the resource, such as the toner or the ink, while maintaining differentiation among contents in the image.

Figure 9:
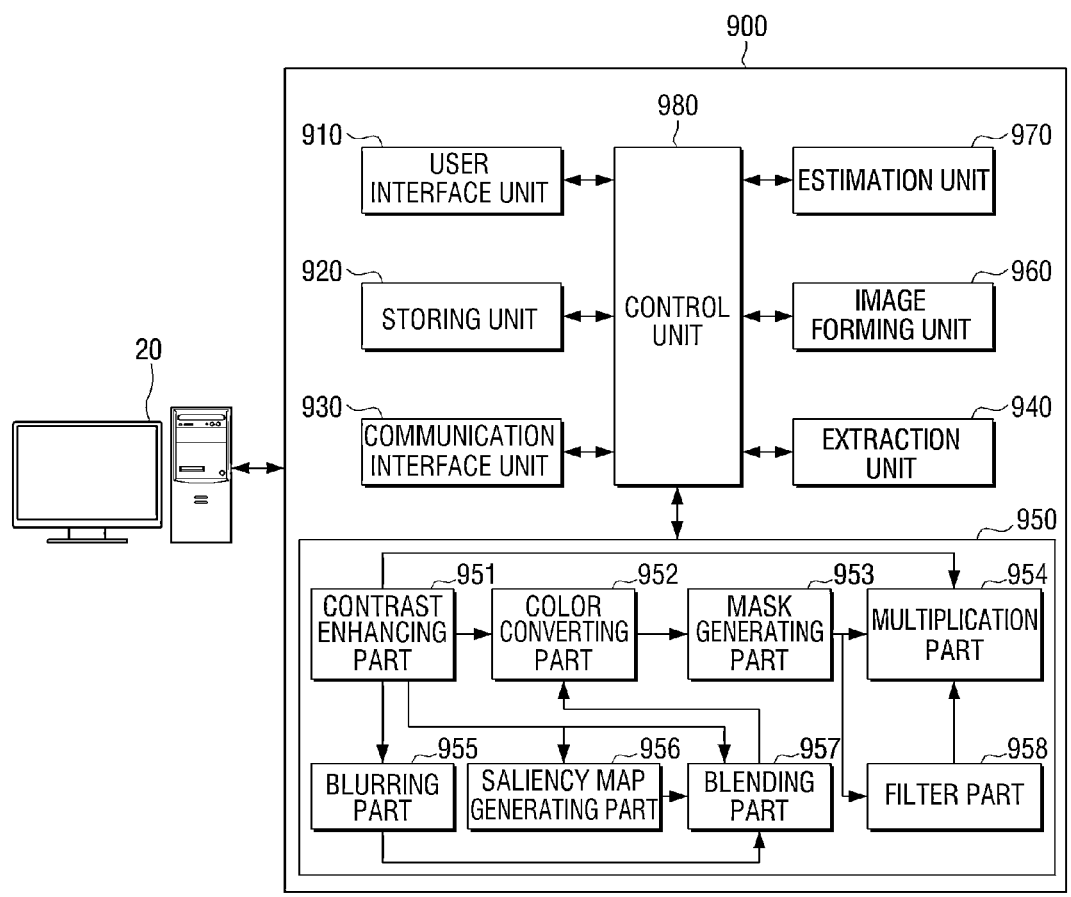
FIG. 9 is a block diagram showing a construction of an image forming apparatus according to an exemplary embodiment of the present general inventive concept.

FIG. 9 is a block diagram showing a construction of the image forming apparatus according to an exemplary embodiment of the present general inventive concept.

Referring to FIG. 9, the image forming apparatus 900 may include a user interface unit 910, a storing unit 920, a communication interface unit 930, an extraction unit 940, a sketch image generating unit 950, an image forming unit 960, an estimation unit 970, and a control unit 980.

The user interface unit 910 has a plurality of function keys with which the user can set or select a variety of functions provided by the image forming apparatus 900, and may display a percentage of saved resource estimated by the estimation unit 970 to be described later. The user interface unit 910 may be embodied by a device, such as a touchpad or the like, capable of simultaneously implementing inputs and outputs, and embodied combining an input device, such as a mouse, a keyboard and the like, and a display device, such a CRT monitor, a LCD monitor, LED or the like.

The storing unit 920 may store print data. The storing unit 920 may store a print date received through the communication interface unit 930 to be described later. Here, the print data may be a page document language (PDL), such as postscript (PS), PCL, XPS, PDF, etc., or a document file transmitted by a direct print method. Further, the storing unit 920 may be embodied by a storing medium in the image forming apparatus 900 and an outer storing medium, for example, a removable disk including a universal serial bus (USB) memory, a storing medium connected to a host, a web server connected through a network, etc.

The communication interface unit 930 is provided to connect the image forming apparatus 900 with a printing control device 20, and may be connected through a USB port, as well as by wire or wirelessly through a local area network (LAN) and an internet network. Further, the communication interface unit 930 may receive the print data from the printing control unit 20, and may receive the document file in the direct print method. Also, the communication interface unit 930 may transmit information for a percentage of saved resource estimated at the estimation unit 970 to be described later to the printing control device 20.

The extraction unit 940 extracts a bitmap image from the print data. The extraction unit 940 may extract the bitmap image among a variety of contents included in the print data. Further, if a plurality of bitmap images is included in the print data, the extraction unit 940 may extract the plurality of bitmap images included in the print data. The extraction unit 940 may comprise a processor, memory, and control logic, and may include programs and drivers stored in memory and executed by a processor. The processor may be part of the control unit 980, and the extraction unit 940 may include programs stored in the storing unit 920, or the extraction unit 940 may comprise separate components from the control unit 980 and storing unit 920.

The sketch image generating unit 950 generates a sketch image using the extracted bitmap image. The sketch image generating unit 950 may include a contrast enhancing part 951, a color converting part 952, a mask generating part 953, a multiplication part 954, a blurring part 955, a Saliency map generating part 956, a blending part 957, and a filter part 958. The sketch image generating unit 950 may comprise a processor, memory, and control logic, and may include programs and drivers stored in memory and executed by a processor. The processor may be part of the control unit 980, and the sketch image generating unit 950 may include programs stored in the storing unit 920, or the sketch image generating unit 950 may comprise separate components from the control unit 980 and storing unit 920.

The contrast enhancing part 951 enhances a contrast of the extracted bitmap image. Since the approach of enhancing the contrast was previously explained with referenced to the step S301 of FIG. 3, a detailed description thereof will be omitted here.

The color converting part 952 converts the bitmap image with the enhanced contrast to a grayscale image. The color converting part 952 may convert the bitmap image with the enhanced contrast to the grayscale image by using one of the mathematic formulas 3, 4, and 5 as described above.

Further, if the blending part 957 to be described later generates a blended bitmap image, the color converting part 952 may convert the blended bitmap image to a grayscale image.

Also, the color converting part 952 may convert a sketch image generated at the multiplication part 958 to be described later to a grayscale sketch image. The color converting part 952 may convert the sketch image generated at the multiplication part 958 to the grayscale sketch image by using one of the mathematic formulas 37, 38, and 39 as described above.

The mask generating part 953 generates a mask by detecting edges of the grayscale image. The mask generating part 953 may generate the mask by detecting edges of the grayscale image generated at the color converting part 952 by using a Difference-of-Gaussians (DOG) filter with a limitation of subsequent threshold, as in the mathematic formula 11 as described above.

The multiplication part 954 multiplies the bitmap image with the enhanced contrast by the mask to generate the sketch image. The multiplication part 954 may generate the sketch image by multiplies each of color channels of the bitmap image with the enhanced contrast by the mask generated at the mask generating part 953, as in the mathematic formulas 12, 13 and 14 as described above.

Further, the multiplication part 954 may generate a sketch image by multiplying each of the color channels of the bitmap image with the enhanced contrast by a mask processed with a dilation filter at the filter part 958 to be described later. The multiplication part 954 may generate the sketch image by multiplying each of the color channels of the bitmap image with the enhanced contrast by the mask generated at the mask generating part 953, as in the mathematic formulas 34, 35, and 36 as described above.

The blurring part 955 blurs the bitmap image with the enhanced contrast. The blurring part 955 may perform a blurring for the bitmap image with the enhanced contrast by convoluting each of r', g', and b' color channels of the bitmap image with the enhanced contrast with the Gaussian filter value as shown in the mathematic formula 15, as in the mathematic formulas 16, 17, and 18 as described above.

The Saliency map generating part 956 generates a Saliency map for the bitmap image with the enhanced contrast. Since the concrete operation of generating the Saliency map is previously explained in detail with referenced to FIG. 6, a detailed description thereof will be omitted.

The blending part 957 blends the bitmap image with the enhanced contrast and the blurred bitmap image by using the generated Saliency map as an alpha channel. The blending part 957 may blend the bitmap image with the enhanced contrast and the blurred bitmap image by using the mathematic formulas 31, 32 and 33 as described above.

The filter part 958 processes the generated mask with the dilation filter.

The image forming unit 960 replaces the bitmap image by the generated sketch image in the print data and prints the print data. The image forming unit 960 may replace the bitmap image in the print job by the sketch image generated at the sketch image generating unit 950, and print the print data in which the bitmap image is replaced by the sketch image. Further, if a plurality of bitmap images is included in the print data, the image forming unit 960 may replace the plurality of bitmap images included in the print data by the corresponding sketch images, respectively, and print the print data in which the plurality of bitmap images is replaced by the corresponding sketch images, respectively. In the exemplary embodiment, although the extraction unit 940, the sketch image generating unit 950, the image forming unit 960 and the estimation unit 970 are explained as being separately formed, they may be embodied by a single component, for example, a raster image processor (RIP) in which all constructions thereof are included, in the image forming apparatus.

The estimation unit 970 may estimate a percentage of resource saved according to the replacement of the bitmap image by the sketch image. Since an approach of estimating the percentage of saved resource was previously explained with referenced to FIG. 2, a detailed description thereof will be omitted here.

The control unit 980 may control a variety of components included in the image forming apparatus 900. When the control unit 980 receives the print data from the printing control device 20, it controls the extraction unit 940 and the sketch image generating unit 950 to extract the bitmap image from the received print data and to convert the extracted bitmap image to the sketch image, respectively. And then, when the sketch image is generated, the control unit 980 controls the image forming unit 960 to print the print data in which the bitmap image is replaced by the sketch image.

Further, the control unit 980 may control the estimation unit 970 to estimate the percentage of saved resource according to the replacement of the bitmap image by the sketch image and control the user interface unit 910 to display the estimated of saved resource and thus to inform the user of it, or to transmit information on the estimated percentage of saved resource to the printing control device 20.

As is apparent from the foregoing description, the image forming apparatus 900 converts the bitmap image included in the print data to the sketch image and prints the print data in which the bitmap image is converted to the sketch image, thereby efficiently saving the resource, such as the toner or the ink, while maintaining the discrimination for contents in the image.

Although the present general inventive concept has been illustrated and explained by the exemplary embodiments, it is not limited to the foregoing exemplary embodiments. The present teaching can be readily applied to other types of apparatuses and many alternatives, modifications, and variations will be apparent to those skilled in the art. Thus, the scope of the present general inventive concept is not to be construed as being limited to the description of the exemplary embodiments, and is to be construed by the attached claims and equivalents.

What is claimed is:

1. An image forming method, comprising:
   extracting, by a processor, a bitmap image from print data;
   generating edge color channel images using the extracted bitmap image;
   converting the extracted bitmap image to a sketch image by multiplying each of edge color channel images of the extracted bitmap image;
   replacing the bitmap image with the sketch image in the print data;
   printing the print data in which the bitmap image is replaced with the sketch image; and
   multiplying each of color channels of the bitmap image.

2. The method of claim 1, further comprising:
   estimating a percentage of a printing resource saved by replacing the bitmap image with the sketch image; and
   informing a user of the estimated percentage of the saved printing resource.

3. The method of claim 2, wherein the estimating the percentage of saved resource comprises calculating the percentage of saved printing resource by using the following formula:

$$E = \frac{\sum_n P(n)}{\sum_n P(n) + \sum_i (100/(100 - Eb(i))) \times Ns(i) - Ns(i)},$$

where E is the percentage of the saved printing resource P(n) is the total number of dots used for printing all the replaced print data, i is the number of bitmap images included in the print data, Ns(i) is the total number of dots used for printing an i-th sketch image, and Eb(i) is a percentage of saved resource for the i-th sketch image according the replacement by the i-th sketch image and is calculated by the following formula:

$$Eb(i)=100\% \times (Nb(i)-Ns(i))/Nb(i),$$

where Nb(i) is the total number of dots used for printing an i-th bitmap image, and Ns(i) is the total number of dots used for printing the i-th sketch image.

4. The method of claim 2, wherein the estimating the percentage of saved printing resource comprises separately calculating percentages of saved printing resources for respective printing colors.

5. The method of claim 1, wherein the converting the extracted bitmap image comprises:
   enhancing a contrast of the extracted bitmap image;
   blurring the bitmap image with the enhanced contrast by using a Gaussian filter;
   generating a Saliency map for the bitmap image with the enhanced contrast;
   blending the bitmap image with the enhanced contrast and the blurred bitmap image by using the generated Saliency map as an alpha channel;
   converting the bitmap image resulting from blending to a grayscale image;
   generating a mask by means of an edge detection of the grayscale image; and multiplying each of color channels of the bitmap image having the enhanced contrast by the mask.

6. The method of claim 5, wherein the detecting the edges of the grayscale image is performed by using a Difference-of-Gaussians filter with a limitation of subsequent threshold, and wherein parameters and the threshold of the Difference-of-Gaussians filter use a printing resolution and the size of image printed on a printing paper.

7. The method of claim 5, wherein the converting further comprises processing the generated mask M with a dilation filter,
wherein the multiplying comprises multiplying each of the color channels of the bitmap image with the enhanced contrast by the mask processed with the dilation filter.

8. The method of claim 1, wherein the converting the extracted bitmap image comprises:
enhancing a contrast of the extracted bitmap image;
converting the bitmap image with the enhanced contrast to a grayscale image;
generating a mask by means of an edge detection of the grayscale image; and
multiplying each of color channels of the bitmap image having the enhanced contrast by the mask to generate the sketch image.

9. The method of claim 8, wherein the edge detection is performed by using a Difference-of-Gaussians filter with a limitation of subsequent threshold, and
wherein parameters and the threshold of the Difference-of-Gaussians filter use a printing resolution and the size of image printed on a printing paper.

10. The method of claim 1, further comprising:
converting the sketch image to a grayscale image by using one of the following formulas:

$I=0.3r+0.6g+0.2b;$ $I=(r+g+b)/3;$ and $I=\max(r,g,b),$ where r, g, and b are color channels of the sketch image, respectively.

11. A printing control device to be connected to an image forming apparatus, comprising:
an extraction unit to extract a bitmap image from a print job;
a sketch image generating unit generate edge color channel images of the extracted bitmap image and to generate a sketch image by multiplying each of edge color channel images of the extracted bitmap image;
a print data generating unit to replace the bitmap image with the generated sketch image in the print job to generate print data; and
a communication interface unit to transmit the generated print data to the image forming apparatus.

12. The device of claim 11, further comprising:
an estimation unit to estimate a percentage of a printing resource saved according to the replacement of the bitmap image by the sketch image; and
a user interface unit to display the estimated percentage of saved printing resource.

13. The device of claim 11, wherein the sketch image generating unit comprises:
a contrast enhancing part to enhance a contrast of the extracted bitmap image;
a color converting part to convert the bitmap image with the enhanced contrast to a grayscale image;
a mask generating part to generate a mask by detecting edges of the grayscale image; and
a multiplication part to multiply the bitmap image having the enhanced contrast by the mask to generate the sketch image.

14. The device of claim 13,
wherein the sketch image generating unit further comprises:
a blurring part to blur the bitmap image with the enhanced contrast;
a Saliency map generating part to generate a Saliency map for the bitmap image with the enhanced contrast; and
a blending part to blend the bitmap image with the enhanced contrast and the blurred bitmap image by using the generated Saliency map as an alpha channel, and
wherein the color converting part converts the bitmap image resulting from blending to a grayscale image.

15. The device of claim 14, wherein the sketch image generating unit further comprises a filter part to process the generated mask with a dilation filter, and
wherein the multiplication part multiplies the bitmap image having the enhanced contrast by the mask processed with the dilation filter.

16. The device of claim 14, wherein the color converting part converts the generated sketch image to a grayscale sketch image, and
wherein the print data generating unit replaces the bitmap image by the grayscale sketch image in the print job to generate the print data.

17. An image forming apparatus comprising:
a communication interface unit to receive print data;
an extraction unit to extract a bitmap image from the received print data;
a sketch image generating unit generate edge color channel images of the extracted bitmap image and to generate a sketch image by multiplying each of edge color channel images of the extracted bitmap image; and
an image forming unit to replace the bitmap image by the generated sketch image in the received print data and to print the print data with the replaced sketch image.

18. The apparatus of claim 17, wherein the sketch image generating unit comprises:
a contrast enhancing part to enhance a contrast of the extracted bitmap image;
a color converting part to convert the bitmap image with the enhanced contrast to a grayscale image;
a mask generating part to generate a mask by detecting edges of the grayscale image; and
a multiplication part to multiply the bitmap image with the enhanced contrast by the mask to generate the sketch image.

19. The apparatus of claim 18, wherein the sketch image generating unit further comprises:
a blurring part to blur the bitmap image with the enhanced contrast;
a Saliency map generating part to generate a Saliency map for the bitmap image with the enhanced contrast; and
a blending part to blend the bitmap image with the enhanced contrast and the blurred bitmap image by using the generated Saliency map as an alpha channel, and
wherein the color converting part converts the bitmap image resulting from blending to a grayscale image.

20. The apparatus of claim 18, wherein the color converting part converts the generated sketch image to a grayscale sketch image, and
wherein the image forming unit replaces the bitmap image by the grayscale sketch image in the print data and prints the print data with the replaced sketch image.

* * * * *

UNITED STATES PATENT AND TRADEMARK OFFICE
CERTIFICATE OF CORRECTION

PATENT NO.       : 9,075,548 B2
APPLICATION NO.  : 14/248599
DATED            : July 7, 2015
INVENTOR(S)      : Ekaterina Tolstaya et al.

It is certified that error appears in the above-identified patent and that said Letters Patent is hereby corrected as shown below:

In the claims

Claim 10, Column 19 (Equation), Line 33 (Approximately)

Delete "$I=0.3r+ 0.6g + 0.2b;$" and insert -- $I=0.3\tilde{r} + 0.6\tilde{g} + 0.2\tilde{b};$ --, therefor.

Claim 10, Column 19 (Equation), Line 35 (Approximately)

Delete "$I=(r+g+b)/3;$" and insert -- $I=(\tilde{r}+\tilde{g}+\tilde{b})/3;$ --, therefor.

Claim 10, Column 19 (Equation), Line 37 (Approximately)

Delete "$I=max\ (r,\ g,\ b),$" and insert -- $I=max\ (\tilde{r},\ \tilde{g},\ \tilde{b}),$ --, therefor.

Claim 10, Column 19 (Equation), Line 39 (Approximately)

Delete "$r,\ g,\ and\ b$" and insert -- $\tilde{r},\ \tilde{g},\ and\ \tilde{b}$ --, therefor.

Signed and Sealed this
Twenty-seventh Day of October, 2015

Michelle K. Lee
*Director of the United States Patent and Trademark Office*